(12) United States Patent
Kawano et al.

(10) Patent No.: US 6,858,298 B2
(45) Date of Patent: Feb. 22, 2005

(54) OPTICAL POLYCARBONATE RESIN MOLDING MATERIAL

(75) Inventors: Shinzi Kawano, Tokyo (JP); Fumi Izumi, Tokyo (JP)

(73) Assignee: Teijin Chemicals, Ltd., Tokyo (JP)

(*) Notice: Subject to any disclaimer, the term of this patent is extended or adjusted under 35 U.S.C. 154(b) by 0 days.

(21) Appl. No.: 10/275,246

(22) PCT Filed: Mar. 4, 2002

(86) PCT No.: PCT/JP02/01965

§ 371 (c)(1),
(2), (4) Date: Nov. 6, 2002

(65) Prior Publication Data

US 2003/0119999 A1 Jun. 26, 2003

(30) Foreign Application Priority Data

| Mar. 7, 2001 | (JP) | ................................ 2001-063526 |
| Mar. 7, 2001 | (JP) | ................................ 2001-063527 |
| Jul. 30, 2001 | (JP) | ................................ 2001-229292 |

(51) Int. Cl.[7] ............... B32B 3/02; B32B 5/16
(52) U.S. Cl. ............... 428/402; 428/397; 428/398; 428/401; 428/64.2; 428/64.4; 428/64.7
(58) Field of Search .................. 428/402, 397, 428/401, 407, 64.1, 64.2, 64.4, 64.7; 264/1.33, 1.29, 1.34

(56) References Cited

U.S. PATENT DOCUMENTS

| 6,066,398 A | * | 5/2000 | Ueda | .................. 428/402 |
| 6,245,405 B1 | * | 6/2001 | Kawano | .................. 428/64.1 |

| 2003/0216538 A1 | * | 11/2003 | Kawano et al. | ............. 528/106 |

FOREIGN PATENT DOCUMENTS

| JP | 63-003021 | | 1/1988 |
| JP | 07-052272 | | 2/1995 |
| JP | 09-183836 | | 7/1997 |
| JP | 11-035692 | * | 2/1999 |
| JP | 2000-204148 | | 7/2000 |
| JP | 2000-242971 | | 9/2000 |

* cited by examiner

*Primary Examiner*—Vivian Chen
(74) *Attorney, Agent, or Firm*—Wenderoth, Lind & Ponack, L.L.P.

(57) ABSTRACT

An optical polycarbonate resin molding material comprising pellets formed from a polycarbonate resin, wherein the pellets satisfy the following properties (1) and (2):

(1) an average of surface areas (hereinafter referred to as "cross sectional areas") in cutting cross sections of the pellets is 3.0 to 6.5 mm$^2$, and a standard deviation thereof is not larger than 0.65 mm$^2$, and (2) an average of ratios of long diameters to short diameters (hereinafter referred to as "long diameter/short diameter") in the cutting cross sections of the pellets is 1.3 to 1.7, and a standard deviation thereof is 0.08 to 0.15, and an optical disc substrate formed from the material.

According to the present invention, when the aromatic polycarbonate resin pellets which satisfy the properties (1) and (2) are used for molding, an optical disc substrate which hardly undergoes occurrence of silver streaks can be obtained, and operations at the time of molding can be facilitated.

22 Claims, 1 Drawing Sheet

OPTICAL POLYCARBONATE RESIN MOLDING MATERIAL

TECHNICAL FIELD

The present invention relates to an optical molding material, for example, a resin molding material suitable for producing an optical recording medium for recording a variety of information signals such as a sound signal and a picture signal, and to a substrate obtained from the material.

BACKGROUND ART

As optical discs which are irradiated with laser light so as to record data thereon or reproduce data therefrom, a digital audio disc (so-called compact disc), an optical video disc (so-called laser disc), a variety of recordable discs, a magneto-optic disc and a phase-change disc are currently practically used.

Of these, the compact disc and the laser disc are read-only-memory (ROM) type optical discs. Generally, in these optical discs, pits and projections corresponding to information signals are formed on a transparent resin substrate, and an aluminum (Al) reflective layer having a thickness of not smaller than 40 nm is formed thereon. In such optical discs, information signals are reproduced by detecting a change in reflectivity by interference of light which occurs in the pits.

Meanwhile, the recordable optical discs are optical discs in which any given data can be written by users, and the magnet-optical disc and the phase-change-type disc are RAM (Random Access Memory) type optical discs in which any given data can be written repeatedly.

More specifically, the recordable optical disc has, on a transparent resin substrate, a recordable recording layer in which an optical property is changed irreversibly and pits and projections are formed by irradiation of laser light. As the recording layer, an organic dye such as a cyanine, phthalocyanine or azoic dye is used, for example. Such an organic dye is decomposed by heat generated by irradiation of laser light. Thereby, its optical constant changes, and the substrate becomes deformed due to a change in its volume.

The magnet-optical disc is a rewritable optical disc in which data can be written and erased repeatedly by a user and has, on a transparent resin substrate, a perpendicular magnetization layer having a magneto-optical effect (such as a Kerr effect) such as a Tb—Fe—Co amorphous alloy thin film. In this magnet-optical disc, minute areas on the perpendicular magnetization layer are magnetized in the upward or downward direction in correspondence with information signals so as to form recording pits. The information signals are reproduced by taking advantage of a fact that a rotation angle θk (Kerr rotation angle) of linear polarization of reflective light is different depending on the directions of magnetization in the perpendicular magnetization layer.

In addition to the magnet-optical disc, the phase-change disc is also a rewritable disc, and a Ge—Sb—Te phase change material which shows being in a crystalline state in an initial state and is then phase-changed to an amorphous state when irradiated with laser light is used therein, for example. In a recording layer of the phase-change disc, minute areas are phase-changed in correspondence with information signals so as to form recording pits, and the information signals are reproduced by detecting changes in reflectivity between amorphous areas corresponding to the pits and crystalline areas other than the amorphous area.

For such magnet-optical and phase-change discs, a four-layer structure obtained by sandwiching the recording layer with transparent dielectric layers and then laminating an aluminum (Al) reflective layer thereon is often employed so as to prevent oxidation of the recording layer and increase a degree of modulation of the signal by multiple interference. As the dielectric layer, a silicon nitride film or a $Zn-SiO_2$ mixed film is used.

Meanwhile, recently, use of such optical discs for recording digital images has been intensively studied, and the study has lead to successful development of a digital versatile disc (DVD) as such an optical disc.

The DVD is designed to be able to record image data corresponding to one movie and reproduce the image data with an image quality comparable to that achieved by current television sets, in spite of having a diameter of 120 mm which is the same as that of CD.

To record such image data in an optical disc, the optical disc must have a recording capacity which is, for example, 6 to 8 times as large as that of CD. Therefore, for the DVD, the wavelength of laser is made as short as 635 to 650 nm as compared with 780 nm for the CD, and the numerical aperture Na of an objective lens is increased to 0.52 or 0.6 as compared with 0.45 for the CD. Thereby, a track pitch and the shortest recording mark length of a pit is decreased so as to increase a recording density.

Of these, the increase in the numerical aperture Na of the objective lens decreases tolerance of a disc substrate to warpage. Therefore, in the case of the DVD, the thickness of the substrate is made as thin as 0.6 mm as compared with 1.2 mm for the CD, thereby making a distance traveled by laser light passing through the disc substrate short and compensating for the tolerance to warpage. Further, in order to compensate for a decrease in disc strength due to a decrease in the thickness of the substrate, a so-called "bonding-together" structure in which another substrate is bonded on a recording layer formed on the substrate is employed as disclosed in JP-A 6-274940. As a recording layer in a bonding-together optical disc, any of the foregoing recording layers used in a single substrate structure, i.e., the recording layer in the ROM-type optical disc, the recording layer in the recordable optical disc and the recording layer in the RAM-type optical disc, can be employed.

Further, the bonding-together optical discs are classified into a bonding-together optical disc only one surface of which is used and a bonding-together optical disc both surfaces of which are used.

In the optical disc resin substrates as described above, a polycarbonate resin which is excellent in moldability, strength, light transmittance and moisture resistance is often used.

To record data in or reproduce data from an optical disc by means of laser light, micron-sized pits and projections formed on a resin substrate are used. Accordingly, when flaws existing in the resin substrate are larger than the pits and projections, the flaws exert a significant influence on reliability of recording and reproduction of data. Consequently, it is required to inhibit occurrence of silver streaks as such flaws.

Examples of causes of occurrence of the silver streaks are hydrolysis of resin pellets due to insufficient drying, thermal decomposition of the pellets in a cylinder, and inclusion of air from a hopper. Of these, as means for inhibiting occurrence of the silver streaks due to inclusion of air, control of lengths of pellets (JP-A 7-52272) and control of lengths and long diameters of pellets (JP-A 11-35692) have been proposed.

Problems to be Solved by the Invention

The present invention has been conceived in view of the above problems. As a result of intensive studies made on the problems, it has been found that frequency of occurrence of silver streaks can be reduced when surface areas (cross-sectional areas) in cutting cross sections of pellets and ratios of long diameters to short diameters (long diameter/short diameter ratio) in the cutting cross sections are within specific ranges and uniform and that use of these pellets facilitates operations at the time of molding.

Means to be Solved by the Invention

According to the present invention, there are provided an optical polycarbonate resin molding material comprising pellets formed from a polycarbonate resin and an optical disc substrate formed from the material. The pellets satisfy the following properties (1) and (2).

(1) An average of surface areas (hereinafter referred to as "cross sectional areas") in cutting cross sections of the pellets is 3.0 to 6.5 $mm^2$, and a standard deviation of the cross sectional areas is not larger than 0.65 $mm^2$.

(2) An average of ratios of long diameters to short diameters (hereinafter referred to as "long diameter/short diameter") in the cutting cross sections of the pellets is 1.3 to 1.7, and a standard deviation of the ratios is 0.08 to 0.15.

Best Mode for Carrying out the Invention

In the present invention, in order to increase reliability in recording and reproduction of data as optical disc substrates of CD-R, CD-RW, MO and digital versatile discs (DVD) typified by DVD-ROM, DVD-Audio, DVD-R and DVD-RAM, particularly as high-density optical disc substrates such as substrates of DVDs, a surface area and a long diameter/short diameter ratio in a cross section of an aromatic polycarbonate resin pellet as a molding material used for molding the substrates are defined.

That is, in the present invention, surface areas (cross-sectional areas) and long diameter/short diameter ratios in the cutting cross sections of the pellets must fall within the above ranges, and standard deviations of the cross-sectional areas and long diameter/short diameter ratios must be equal to or lower than given values. The long diameter in the cutting cross section of the pellet refers to a length (mm) of the longest diameter in the cutting cross section, the short diameter refers to a length (mm) of the shortest diameter in the cutting cross section, and the cross-sectional area refers to a value ($mm^2$) which is calculated from the long diameter and the short diameter in accordance with definition to be described later.

When pellets with an average of cross-sectional areas of 3.0 to 6.5 $mm^2$ and a standard deviation of the cross-sectional areas of not larger than 0.65 $mm^2$ are used, occurrence of silver streaks can be inhibited, thereby increasing reliability in recording of data. However, when the average of the cross-sectional areas is out of the above range, the silver streaks occur, so that high reliability in recording and reproduction of data cannot be achieved.

When the average of the cross-sectional areas is 3.0 to 6.5 $mm^2$, preferably 3.3 to 6.0 $mm^2$, more preferably 3.7 to 5.0 $mm^2$, a more secure effect can be obtained. Meanwhile, when the standard deviation of the cross-sectional areas is not larger than 0.65 $mm^2$, preferably not larger than 0.55 $mm^2$, more preferably not larger than 0.50 $mm^2$, a more secure effect can be obtained.

When pellets have an average of long diameter/short diameter ratios in cutting cross sections of 1.3 to 1.7 and a standard deviation of the ratios of 0.08 to 0.15, occurrence of the silver streaks can be inhibited, thereby increasing reliability in recording of data. However, when the average of the long diameter/short diameter ratios is out of the above range, the silver streaks occur, so that high reliability in recording and reproduction of data cannot be achieved.

When the average of the long diameter/short diameter ratios is 1.3 to 1.7, preferably 1.4 to 1.6, a more secure effect can be obtained. Meanwhile, when the standard deviation of the ratios is 0.08 to 0.15, preferably 0.10 to 0.13, a more secure effect can be obtained.

Surface areas (cross-sectional areas) and long diameter/short diameter ratios in cutting cross sections of pellets provided by the present invention satisfy the above ranges. An optical disc substrate formed by use of the pellets of the present invention hardly undergoes occurrence of the silver streaks and has an excellent value as a substrate for a data recording medium.

According to studies made by the present inventors, it has been found that in addition to the surface areas and long diameter/short diameter ratios in the cutting cross sections of the pellets which should fall within the above ranges, sizes and a proportion of bubbles contained in the pellets are also related to occurrence of the silver streaks.

More specifically, it is advantageous that the aromatic polycarbonate resin pellets which are the molding material of the present invention have a bubble occurrence rate of not higher than 35%, a maximum bubble volume of not larger than 2.0 $mm^3$, and a percentage of bubble volume of not higher than 2.0%.

When the pellets have a bubble occurrence rate of not higher than 35%, a maximum bubble volume of not larger than 2.0 $mm^3$, and a percentage of bubble volume of not higher than 2.0%, occurrence of the silver streaks can be further inhibited, thereby increasing reliability in recording of data.

The bubble occurrence rate of the pellets is defined as "'number of pellets having bubbles (or voids) therein' divided by 'number of all pellets' expressed in percentage". The maximum bubble volume is defined as "volume of the largest bubble (void) in a pellet", and the percentage of bubble volume is defined as "'total of volumes of bubbles (voids) in the pellets' divided by 'total of volumes of all pellets' expressed in percentage". Further, the term "bubble (void)" as used herein refers to a bubble having a volume of not smaller than 0.01 $mm^3$.

When the pellets have a bubble occurrence rate of not higher than 35%, preferably not higher than 30%, more preferably not higher than 25%, a maximum bubble volume of 2.0 $mm^3$, preferably 1.5 $mm^3$, more preferably 1.0 $mm^3$, and a percentage of bubble volume of not higher than 2.0%, preferably not higher than 1.5%, more preferably not higher than 1.0%, the effect is secured. As the pellets, those having a circular, oval or rectangular cross section and a length of 2.5 to 3.5 mm are appropriate.

According to the studies made by the present inventors, it has been found that an average of weights of the pellets and a standard deviation of the weights also have influence on obtaining an optical disc substrate in which the silver streaks hardly occur. More specifically, when the average of the weights of the pellets is 13 to 26 mg, preferably 14 to 24 mg, more preferably 15 to 20 mg and the standard deviation is not larger than 2.2 mg, preferably not larger than 2.0 mg, more preferably not larger than 1.8 mg, the effect is further secured.

When the pellets of the present invention have an angle of repose when accmulated of 23° to 28°, preferably 24° to 27°, more preferably 25° to 26°, occurrence of the silver streaks can be further inhibited. Such pellets are advantageous in increasing reliability in recording of data and appropriate since operations at the time of molding are facilitated. The angle of repose of the pellets is a value calculated by dropping the pellets from a height of 5 cm onto a polycarbonate disc having a diameter of 13 cm so as to cause the pellets to accumulate thereon, measuring a height (H) of the conical accumulative layer, and substituting the height (H) into the following formula.

$$\text{angle of repose } \phi(°) = \tan^{-1}(H/6.5)$$

The polycarbonate resin used in the present invention is generally obtained by reacting a dihydric phenol with a carbonate precursor by such a process as an interfacial polymerization process or an ester interchange process (melt polymerization process). Representative examples of the dihydric phenol used in the reaction include hydroquinone, resorcinol, 4,4'-dihydroxydiphenyl, bis(4-hydroxyphenyl) methane, bis{(4-hydroxy-3,5-dimethyl)phenyl}methane, 1,1-bis(4-hydroxyphenyl)ethane, 1,1-bis(4-hydroxyphenyl)-1-phenylethane, 2,2-bis(4-hydroxyphenyl)propane (common name: bisphenol A), 2,2-bis{(4-hydroxy-3-methyl)phenyl}propane, 2,2-bis{(4-hydroxy-3,5-dimethyl)phenyl}propane, 2,2-bis{(3,5-dibromo-4-hydroxy)phenyl}propane, 2,2-bis{(3-isopropyl-4-hydroxy)phenyl}propane, 2,2-bis{(4-hydroxy-3-phenyl)phenyl}propane, 2,2-bis(4-hydroxyphenyl)butane, 2,2-bis(4-hydroxyphenyl)-3-methylbutane, 2,2-bis(4-hydroxyphenyl)-3,3-dimethylbutane, 2,4-bis(4-hydroxyphenyl)-2-methylbutane, 2,2-bis(4-hydroxyphenyl)pentane, 2,2-bis(4-hydroxyphenyl)-4-methylpentane, 1,1-bis(4-hydroxyphenyl)cyclohexane, 1,1-bis(4-hydroxyphenyl)-4-isopropylcyclohexane, 1,1-bis(4-hydroxyphenyl)-3,3,5-trimethylcyclohexane, 9,9-bis(4-hydroxyphenyl)fluorene, 9,9-bis{(4-hydroxy-3-methyl)phenyl}fluorene, α,α'-bis(4-hydroxyphenyl)-o-diisopropylbenzene, α,α'-bis(4-hydroxyphenyl)-m-diisopropylbenzene, α,α'-bis(4-hydroxyphenyl)-p-diisopropylbenzene, 1,3-bis(4-hydroxyphenyl)-5,7-dimethyladamantane, 4,4'-dihydroxydiphenylsulfone, 4,4'-dihydroxydiphenylsulfoxide, 4,4'-dihydroxydiphenylsulfide, 4,4'-dihydroxydiphenylketone, 4,4'-dihydroxydiphenyl ether, and 4,4'-dihydroxydiphenyl ester. These can be used solely or in admixture of two or more.

Of these, a homopolymer or copolymer obtained from at least one bisphenol selected from the group consisting of bisphenol A, 2,2-bis{(4-hydroxy-3-methyl)phenyl}propane, 2,2-bis(4-hydroxyphenyl)butane, 2,2-bis(4-hydroxyphenyl)-3-methylbutane, 2,2-bis(4-hydroxyphenyl)-3,3-dimethylbutane, 2,2-bis(4-hydroxyphenyl)-4-methylpentane, 1,1-bis(4-hydroxyphenyl)-3,3,5-trimethylcyclohexane and α,α'-bis(4-hydroxyphenyl)-m-diisopropylbenzene is preferred, and a homopolymer of bisphenol A and a copolymer of 1,1-bis(4-hydroxyphenyl)-3,3,5-trimethylcyclohexane, and bisphenol A, 2,2-bis{(4-hydroxy-3-methyl)phenyl}propane or α,α'-bis(4-hydroxyphenyl)-m-diisopropylbenzene are particularly preferably used. Of these, the homopolymer of bisphenol A shows excellent practical utility.

As the carbonate precursor, a carbonyl halide, a carbonate ester or a haloformate is used. Specific examples thereof include phosgene, diphenyl carbonate, and a dihaloformate of a dihydric phenol.

To produce the polycarbonate resin by reacting the dihydric phenol with the carbonate precursor by, for example, an interfacial polymerization process or an ester interchange process, a catalyst, an antioxidant for the dihydric phenol, and the like may be used as required. Further, the polycarbonate resin may be a branched polycarbonate resin copolymerized with a multifunctional aromatic compound having at least three functional groups, a polyester carbonate resin copolymerized with an aromatic or aliphatic bifunctional carboxylic acid, or a mixture of two or more polycarbonate resins obtained.

A reaction carried out by the interfacial polymerization process is generally a reaction between a dihydric phenol and phosgene, and they are reacted with each other in the presence of an acid binding agent and an organic solvent. As the acid binding agent, for example, an alkali metal hydroxide such as sodium hydroxide or potassium hydroxide or an amine compound such as pyridine is used. As the organic solvent, a hydrocarbon halide such as methylene chloride or chlorobenzene is used. Further, to accelerate the reaction, a catalyst such as a tertiary amine, a quaternary ammonium compound or a quaternary phosphonium compound, e.g., triethylamine, tetra-n-butylammonium bromide or tetra-n-butylphosphonium bromide, can also be used. In that case, it is preferable that the reaction temperature be generally kept at 0 to 40° C., the reaction time be set at about 10 minutes to 5 hours, and the pH during the reaction be kept at 9 or larger.

A reaction carried out by the ester interchange process is generally a reaction between a dihydric phenol and a carbonate ester, and the reaction is carried out by a method which comprises mixing the dihydric phenol with the carbonate ester under heating in the presence of an inert gas so as to distill out a produced monohydroxy compound (such as phenol). The reaction temperature varies depending on the boiling point of the produced monohydroxy compound and other factors, but it is generally 120 to 350° C. In a late stage of the reaction, the reaction system is depressurized to about 10 to 0.1 Torr so as to facilitate distilling out the produced monohydroxy compound. The monohydroxy compound produced during the reaction remains in the polycarbonate resin. Therefore, a sufficient reaction time is required and is generally about 1 to 4 hours.

The carbonate ester is, for example, an ester of an aryl group having 6 to 10 carbon atoms which may be substituted, an aralkyl group or an alkyl group having 1 to 4 carbon atoms. Specific examples of the ester include diphenyl carbonate, ditolyl carbonate, bis(chlorophenyl) carbonate, m-cresyl carbonate, dinaphthyl carbonate, bis (diphenyl)carbonate, dimethyl carbonate, diethyl carbonate, and dibutyl carbonate. Of these, diphenyl carbonate is preferred.

Further, to accelerate the polymerization, polymerization catalysts can be used. As the polymerization catalysts, catalysts which are generally used in an esterification reaction or an ester exchange reaction can be used, such as alkali metal compounds, e.g., sodium hydroxide, potassium hydroxide, and sodium salts and potassium salts of dihydric phenols; alkaline earth metal compounds, e.g., calcium hydroxide, barium hydroxide, and magnesium hydroxide; nitrogen-containing basic compounds, e.g., tetramethylammonium hydroxide, tetraethylammonium hydroxide, trimethylamine, and triethylamine; alkoxides of alkali metals and alkaline earth metals; organic acid salts of alkali metals and alkaline earth metals; zinc compounds; boron compounds; aluminum compounds; silicon compounds; germanium compounds; organotin compounds; lead compounds; osmium compounds; antimony compounds; manganese compounds; titanium compounds; and zirconium compounds. The catalysts may be used solely or in admixture of two or more. These polymerization catalysts are used in an amount selected from a range of preferably $1 \times 10^{-8}$ to $1 \times 10^{-4}$ equivalents, more preferably $1 \times 10^{-7}$ to $5 \times 10^{-4}$ equivalents, per mole of the dihydric phenol which is a raw material.

Further, in the polymerization reaction, in order to decrease the number of phenolic terminal groups, terminal blocking agents other than monofunctional phenols, such as compounds exemplified by bis(chlorophenyl)carbonate, bis(bromophenyl)carbonate, bis(nitrophenyl)carbonate, bis(phenylphenyl)carbonate, chlorophenylphenyl carbonate, bromophenylphenyl carbonate, nitrophenylphenyl carbonate, phenylphenyl carbonate, methoxycarbonylphenylphenyl carbonate and ethoxycarbonylphenylphenyl carbonate are preferably added in a late stage or after completion of the polycondensation reaction. Above all, 2-chlorophenylphenyl carbonate and 2-methoxycarbonylphenylphenyl are preferred, and 2-methoxycarbonylphenylphenyl is particularly preferably used.

The molecular weight of the polycarbonate resin is preferably 10,000 to 22,000, more preferably 12,000 to 20,000, particularly preferably 13,000 to 18,000, in terms of viscosity average molecular weight (M). A polycarbonate resin with the above viscosity average molecular weight is preferred since it achieves sufficient strength as an optical material and also has such good melt flowability at the time of molding that it does not undergo molding distortion. The viscosity average molecular weight in the present invention is calculated by substituting specific gravity ($\eta_{sp}$) determined from a solution prepared by dissolving 0.7 g of the polycarbonate resin in 100 mL of methylene chloride at 20° C. into the following formula.

$\eta_{sp}/c=[\eta]+0.45 \times [\eta]^2 c$ (wherein $[\eta]$ is limiting viscosity) $[\eta]= 1.23 \times 10^{-4} M^{0.83} c=0.7$ The pellets of the present invention are suitably polycarbonate resin pellets produced by the aforementioned ester interchange process. Further, the polycarbonate resin is advantageously a polycarbonate resin containing terminal phenolic hydroxyl groups (OH groups) in an amount of 5 to 100 equivalents, preferably 10 to 70 equivalents, per ton of the resin.

After produced by a conventionally known process (such as an interfacial polymerization process or an ester interchange process), the polycarbonate resin is preferably subjected to extraction with alkali or filtration in a solution state or washed with polycarbonate poor solvents and non-solvents such as ketones, e.g., acetone, aliphatic hydrocarbons, e.g., hexane, and aromatic hydrocarbons, e.g., xylene after granulation (or removal of a solvent) so as to remove impurities and foreign matter such as low-molecular-weight components and unreacted components. Further, in an extrusion step (pelletization step) in which polycarbonate resin pellets to be injection-molded are obtained, the polycarbonate resin is preferably passed through a sintered metal filter with a filtration accuracy of 10 μm in a molten state so as to remove foreign matter. As required, additives such as a mold releasing agent, e.g., a polyhydric alcohol fatty acid ester, and an antioxidant, e.g., a phosphorus-based antioxidant, are preferably added. In all cases, it is necessary to minimize contents of foreign matter, impurities and solvents in the resin as a raw material before injection-molding (pelletization step).

The pellets can be prepared by extruding the polycarbonate resin into a strand by means of a melt extruder, passing the strand through a cooling bath filled with hot water so as to cool the strand, and cutting the strand with a cutter.

Pellets which satisfy the conditions defined in the present invention can be obtained by selecting means and conditions in preparation thereof and, as required, performing an operation of classifying obtained pellets as appropriate.

That is, the target pellets can be obtained by selecting preparation means and conditions, including a shape of a die in the melt extruder, a melt extrusion temperature, a temperature of the cooling water, a pulling tension of the strand, a pulling speed of the strand, a rotational speed of the cutter, and a temperature of the strand at the time of cutting, as appropriate. Further, since the obtained pellets include powders, strips and coarse pellets caused by unsuccessful cutting, it is desirable to remove them. Therefore, it is required to perform the operation of classifying the pellets so as to obtain pellets having a uniform shape. The classification operation is performed by use of, for example, a punching metal or a sieve.

To produce the optical disc substrate from the polycarbonate resin pellets, an injection molding machine (including an injection compression molding machine) is used. Although the injection molding machine may be one which is commonly used, an injection molding machine whose cylinder and screw are made of a material showing low adhesion to the resin and corrosion resistance and abrasion resistance is preferably used in order to inhibit generation of carbides and increase reliability of the disc substrate. As for conditions for injection molding, a cylinder temperature of 300 to 400° C. and a mold temperature of 50 to 140° C. are preferred, and this is preferably as clean as possible. Further, it is important to fully dry the pellets to be molded so as to remove moisture and to pay attention so as to prevent residence which may cause decomposition of the resin from occurring. Further, it is also important to be careful not to use a substrate with abnormal birefringence and/or mechanical properties as a product or a test substrate.

The optical disc substrate molded by use of the optical polycarbonate resin molding material (pellets) according to the present invention hardly has silver streaks and is excellent as substrates of optical discs such as CD-R, CD-RW, MO and digital versatile discs (DVD) typified by a digital video disc, DVD-ROM, DVD-Audio, DVD-R and DVD-RAM, particularly as substrates of DVDs.

Figure 2:
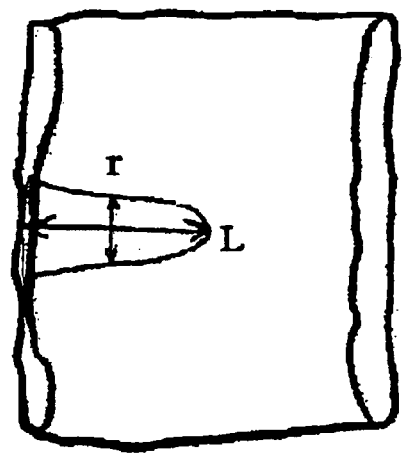
FIG. 2 shows a schematic representation of a semi-cylindrical bubble in a pellet when the pellet is observed from its side.
Figure 3:
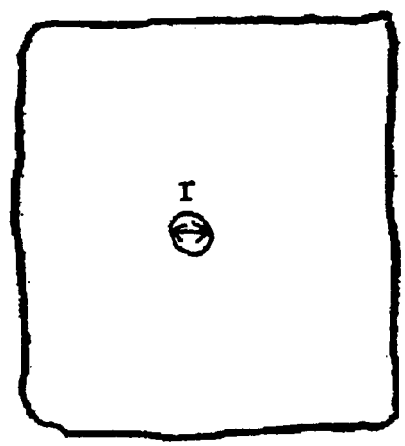
FIG. 3 shows a schematic representation of a spherical bubble in a pellet when the pellet is observed from its side.

As for symbols in these figures, L represents a length in the horizontal direction of the cylindrical bubble (FIG. 1) or the semi-cylindrical bubble (FIG. 2), and r represents a length in the vertical direction (diameter) of the cylindrical bubble (FIG. 1) or a length in the vertical direction (diameter) of the semi-cylindrical bubble (FIG. 2) at the midpoint of L or a length (diameter) of the spherical bubble (FIG. 3).

Hereinafter, the present invention will be described in detail with reference to Examples. However, the present invention shall not be limited by these Examples in any way.

Examples 1 to 5 and Comparative Examples 1 to 5

Polycarbonate resin pellets in Examples and Comparative Examples were cylindrical pellets with oval cutting cross sections which were obtained by extruding a resin prepared by an ester interchange process or an interfacial polymerization process into a strand by means of a melt extruder, passing the strand through a cooling bath filled with hot water so as to cool it, and cutting the strand with a cutter. At that time, conditions for preparing the pellets such as a temperature of the cooling water, a shape of a die, a pulling tension, a pulling speed, a rotational speed of a cutter blade and a temperature of the strand at the time of cutting were selected as appropriate and conditions for classifying the pellets by use of a punching metal or a sieve were also selected as appropriate, thereby obtaining the pellets having properties shown in Table 1.

The properties of the pellets were measured by the following methods. Further, moldings of substrates and measurements of silver streaks were carried out in accordance with the following methods.

(1) Measurement of Cross-Sectional Area

By means of a micrometer, long diameters and short diameters of cutting cross sections of 300 pellets were measured, and cross-sectional areas were calculated in accordance with the following formula.

$$D = \pi \times a/2 \times b/2$$

D: cross-sectional area (mm$^2$)
a: long diameter (mm)
b: short diameter (mm)

Then, by use of the results, an average and a standard deviation were calculated. The standard deviation was calculated in accordance with the following formula.

$$\text{Standard Deviation} = [\{\Sigma D^2 - (\Sigma D)^2/300\}/299]^{1/2}$$

(2) Measurement of Long Diameter/Short Diameter

By means of a micrometer, long diameters (a) and short diameters (b) of cutting cross sections of 300 pellets were measured so as to calculate long diameter/short diameter ratios (R). Then, by use of the results, an average and a standard deviation were calculated. The standard deviation was calculated in accordance with the following formula.

$$\text{Standard Deviation} = [\{\Sigma R^2 - (\Sigma R)^2/300\}/299]^{1/2}$$

R: long diameter/short diameter ratio (3) Measurement of Weight

By means of an electronic balance, weights of 300 pellets were measured, and an average and a standard deviation were calculated. The standard deviation was calculated in accordance with the following formula.

$$\text{Standard Deviation} = [\{\Sigma M^2 - (\Sigma M)^2/300\}/299]^{1/2}$$

M: weight (mg)

(4) Measurement of Bubble Occurrence Rate

Presence and absence of bubbles in 300 pellets were observed visually, and a rate of occurrence thereof was calculated.

(5) Measurement of Maximum Bubble Volume (Vb)

Figure 1:
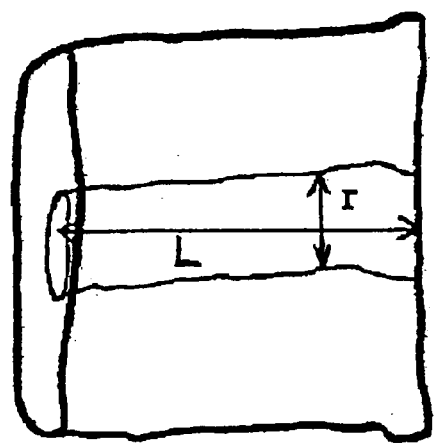
FIG. 1 shows a schematic representation of a cylindrical bubble in a pellet when the pellet is observed from its side, with right and left ends of the pellet in the representation being cutting cross sections (as in the case of FIGS. 2 and 3).

(a) Cylindrical Bubble (FIGS. 1 and 2)

By use of a digital HD microscope VH-7000 manufactured by KEYENCE CO., LTD., a bubble in a pellet was observed from a side of the pellet, and its lengths in the vertical and horizontal directions were measured by use of a scale. Based on the results, the volume of the bubble was calculated in accordance with the following formula.

$$Vb = \pi \times (r/2) \times (r/2) \times L$$

Vb: volume of bubble (mm$^3$)
r: length in the vertical direction of bubble (mm)
L: length in the horizontal direction of bubble (mm)
(In FIG. 2, r is a length (mm) in the vertical direction at the midpoint of the length L.)

(b) Spherical Bubble (FIG. 3)

By use of a digital HD microscope VH-7000 manufactured by KEYENCE CO., LTD., a bubble in a pellet was observed from a side of the pellet, and its diameter was measured by use of a scale. Based on the result, the volume of the bubble was calculated in accordance with the following formula.

$$Vb = 4/3 \times \pi \times (r/2)^3$$

Vb: volume of bubble (mm$^3$)
r: diameter of bubble (mm)
(The diameter r of the bubble in FIG. 3 is a diameter which is an average of lengths in the vertical and horizontal directions.)

The above operations were performed on 300 pellets, and a maximum value was taken as a maximum bubble volume.

(6) Measurement of Percentage of Bubble Volume (a) Calculation of Pellet Volume (Vp)

By means of a micrometer, long diameters (a) and short diameters (b) in cutting cross sections of 300 pellets and lengths (W) of the pellets were measured, and volumes of the pellets were calculated in accordance with the following formula.

$$Vp = \pi \times (a/2) \times (b/2) \times W$$

Vp: volume of pellet (mm$^3$)
a: long diameter in cross section of pellet (mm)
b: short diameter in cross section of pellet (mm)
W: length of pellet (mm)

(b) Calculation of Bubble Volume

Volumes of bubbles were calculated in the same manner as the maximum bubble volume was determined.

(c) Calculation of Percentage of Bubble Volume

By use of a total of the volumes of the 300 pellets which were calculated in the above (a) and a total of the volumes of bubbles in the 300 pellets which were calculated in the above (b), a percentage of bubble volume was calculated in accordance with the following formula.

$$R = (\Sigma Vb/\Sigma Vp) \times 100$$

R: percentage of bubble volume (%)
ΣVb: total of volumes of bubbles in 300 pellets
ΣVp: total of volumes of 300 pellets (7) Silver Streaks A specially designed mold for a DVD was attached to an injection molding machine (DISK 3M III, product of Sumitomo Heavy Industries, Ltd.), a nickel DVD stamper with pits was attached to the mold, pellets as a molding material which had been dried in a dryer at 120° C. for at least 4 hours were automatically fed to a hopper of the molding machine, and 300 DVD substrates were molded continuously at a cylinder temperature of 375° C. and a mold temperature of 113° C. Then, silver streaks in the substrates were observed visually, and a total number of silver streaks occurred was determined. The results are shown in Table 1.

TABLE 1

| | Cross-Sectional Area (mm²) | | Long Diameter/ Short Diameter | | Bubble Occurrence Rate (%) | Maximum Bubble Volume (mm³) |
|---|---|---|---|---|---|---|
| | Average | Standard Deviation | Average | Standard Deviation | | |
| Ex. 1 | 4.8 | 0.20 | 1.54 | 0.12 | 24.0 | 0.88 |
| Ex. 2 | 3.8 | 0.48 | 1.56 | 0.11 | 23.5 | 0.92 |
| Ex. 3 | 5.6 | 0.40 | 1.45 | 0.11 | 23.0 | 0.86 |
| Ex. 4 | 4.9 | 0.45 | 1.48 | 0.12 | 24.3 | 0.90 |
| Ex. 5 | 4.4 | 0.48 | 1.35 | 0.14 | 23.0 | 0.94 |
| C. Ex. 1 | 6.9 | 0.71 | 1.92 | 0.19 | 38.0 | 2.30 |
| C. Ex. 2 | 2.9 | 0.69 | 2.01 | 0.18 | 39.0 | 2.20 |
| C. Ex. 3 | 7.3 | 0.68 | 1.13 | 0.07 | 33.2 | 1.80 |
| C. Ex. 4 | 7.1 | 0.73 | 1.66 | 0.14 | 31.5 | 1.75 |
| C. Ex. 5 | 3.2 | 0.63 | 2.22 | 0.06 | 34.0 | 1.85 |

| | Percentage of Bubble Volume (%) | Weight (mg) | | Production Process | Number of Silver Streaks Occurred |
|---|---|---|---|---|---|
| | | Average | Standard Deviation | | |
| Ex. 1 | 0.6 | 17.2 | 1.6 | A | 2 |
| Ex. 2 | 0.7 | 15.5 | 1.7 | B | 3 |
| Ex. 3 | 0.9 | 18.5 | 1.2 | A | 7 |
| Ex. 4 | 0.7 | 20.0 | 1.9 | A | 9 |
| Ex. 5 | 0.7 | 18.0 | 1.0 | A | 6 |
| C. Ex. 1 | 2.7 | 28.2 | 2.6 | A | 76 |
| C. Ex. 2 | 2.6 | 11.0 | 2.5 | B | 70 |
| C. Ex. 3 | 1.9 | 24.2 | 2.1 | A | 47 |
| C. Ex. 4 | 1.8 | 25.0 | 2.0 | A | 35 |
| C. Ex. 5 | 1.6 | 13.2 | 2.1 | A | 30 |

Ex.: Example,
C. Ex.: Comparative Example
A: Ester Interchange Process
B: Interfacial polymerization Process

What is claimed is:

1. An optical polycarbonate resin molding material comprising pellets formed from a polycarbonate resin, wherein the pellets satisfy the following properties (1), (2) and (5):

(1) an average of surface areas (hereinafter referred to as "cross sectional areas") in cutting cross sections of the pellets is 3.0 to 6.5 mm², and a standard deviation thereof is not larger than 0.65 mm²;

(2) an average of ratios of long diameters to short diameters (hereinafter referred to as "long diameter/short diameter") in the cutting cross sections of the pellets is 1.3 to 1.7, and a standard deviation thereof is 0.08 to 0.15; and (5) a length of 2.5 to 3.5 mm.

2. The material of claim 1, wherein the pellets also satisfy the following property (3):

(3) the pellets have a bubble occurrence rate of not higher than 35%, a maximum bubble volume of not larger than 2.0 mm³, and a percentage of bubble volume of not higher than 2.0%.

3. The material of claim 2, wherein the pellets also satisfy the following property (4):

(4) the pellets have an average of their weights of 13 to 26 mg and a standard deviation of the weights of not larger than 2.2 mg.

4. An optical disc substrate formed from the optical polycarbonate resin molding material of claim 3.

5. The optical disc substrate of claim 4 wherein the optical disc is a compact disc (CD) or a digital versatile disc (DVD).

6. A data recording medium comprising the optical disc substrate of claim 4.

7. An optical disc substrate formed from the optical polycarbonate resin molding material of claim 2.

8. The optical disc substrate of claim 7 wherein the optical disc is a compact disc (CD) or a digital versatile disc (DVD).

9. A data recording medium comprising the optical disc substrate of claim 7.

10. The material of claim 1, wherein the pellets also satisfy the following property (4):

(4) the pellets have an average of their weights of 13 to 26 mg and a standard deviation of the weights of not larger than 2.2 mg.

11. An optical disc substrate formed from the optical polycarbonate resin molding material of claim 10.

12. The optical disc substrate of claim 11 wherein the optical disc is a compact disc (CD) or a digital versatile disc (DVD).

13. A data recording medium comprising the optical disc substrate of claim 11.

14. The material of claim 1, wherein the pellets have an average of their cross-sectional areas of 3.3 to 6.0 mm² and a standard deviation of the cross-sectional areas of not larger than 0.55 mm².

15. The material of claim 1, wherein the pellets have an average of their long diameter/short diameter ratios of 1.4 to 1.6 and a standard deviation of the ratios of 0.10 to 0.13.

16. The material of claim 1, wherein the polycarbonate resin has a viscosity average molecular weight of 10,000 to 22,000.

17. The material of claim 1, wherein the polycarbonate resin is a polycarbonate comprising 2,2-bis(4-hydroxyphenyl)propane as a main dihydric phenol component.

18. The material of claim 1, wherein the polycarbonate resin is a polycarbonate comprising 2,2-bis(4-hydroxy) propane as a main dihydric phenol component and obtained by an ester interchange process.

19. The material of claim 1, wherein the polycarbonate resin is a polycarbonate containing phenolic hydroxyl groups (OH groups) in an amount of 5 to 100 equivalents/Ton.

20. An optical disc substrate formed from the optical polycarbonate resin molding material of claim 1.

21. The optical disc substrate of claim 20 wherein the optical disc is a compact disc (CD) or a digital versatile disc (DVD).

22. A data recording medium comprising the optical disc substrate of claim 20.

* * * * *